Dec. 10, 1957 G. D. SMITH 2,815,762
COLLAPSIBLE CANOPY FRAME ATTACHMENT FOR VEHICLE TRUNKS
Filed Dec. 13, 1954 2 Sheets-Sheet 2
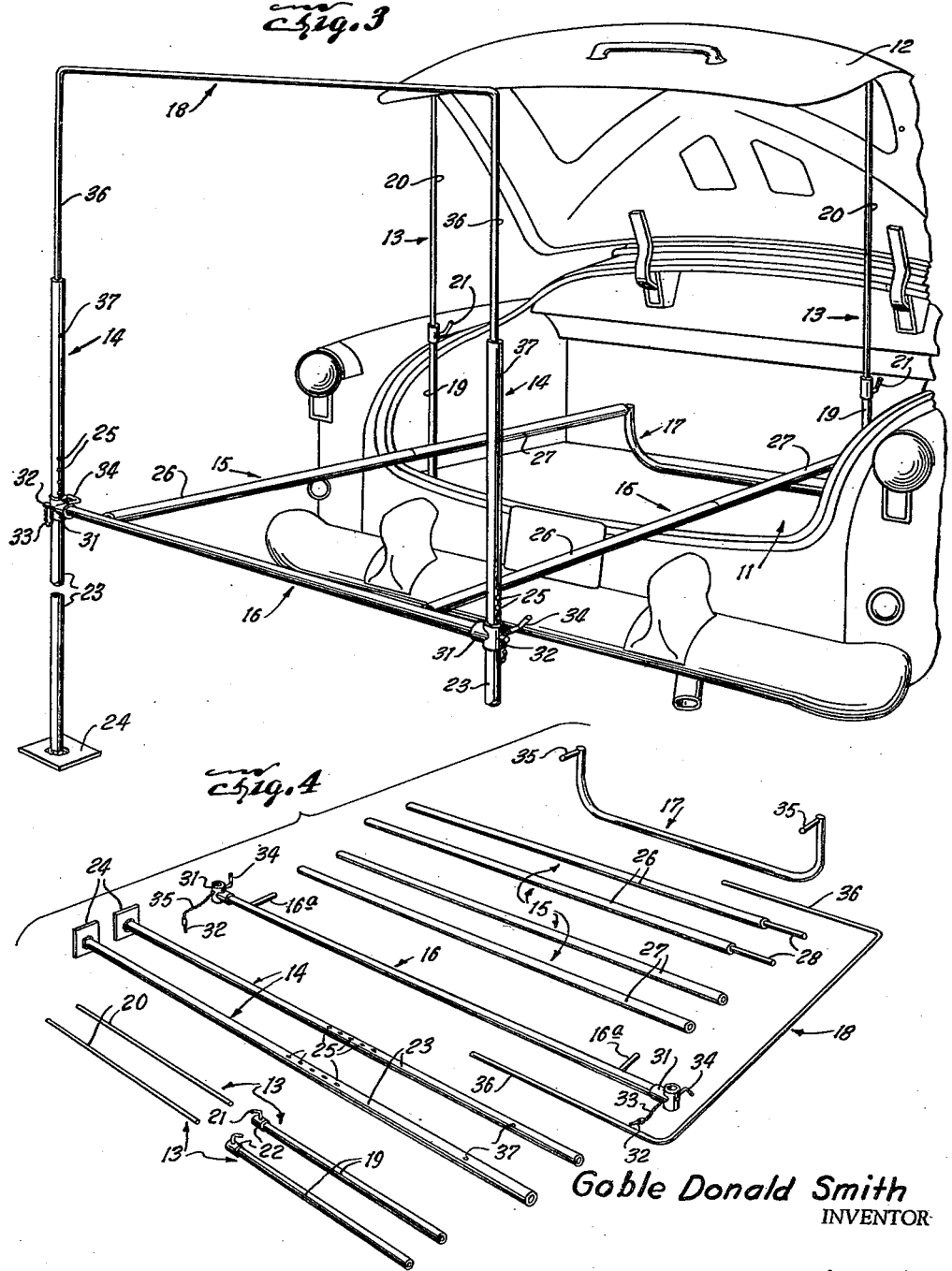
Goble Donald Smith
INVENTOR
ATTORNEY United States Patent Office 2,815,762
Patented Dec. 10, 1957

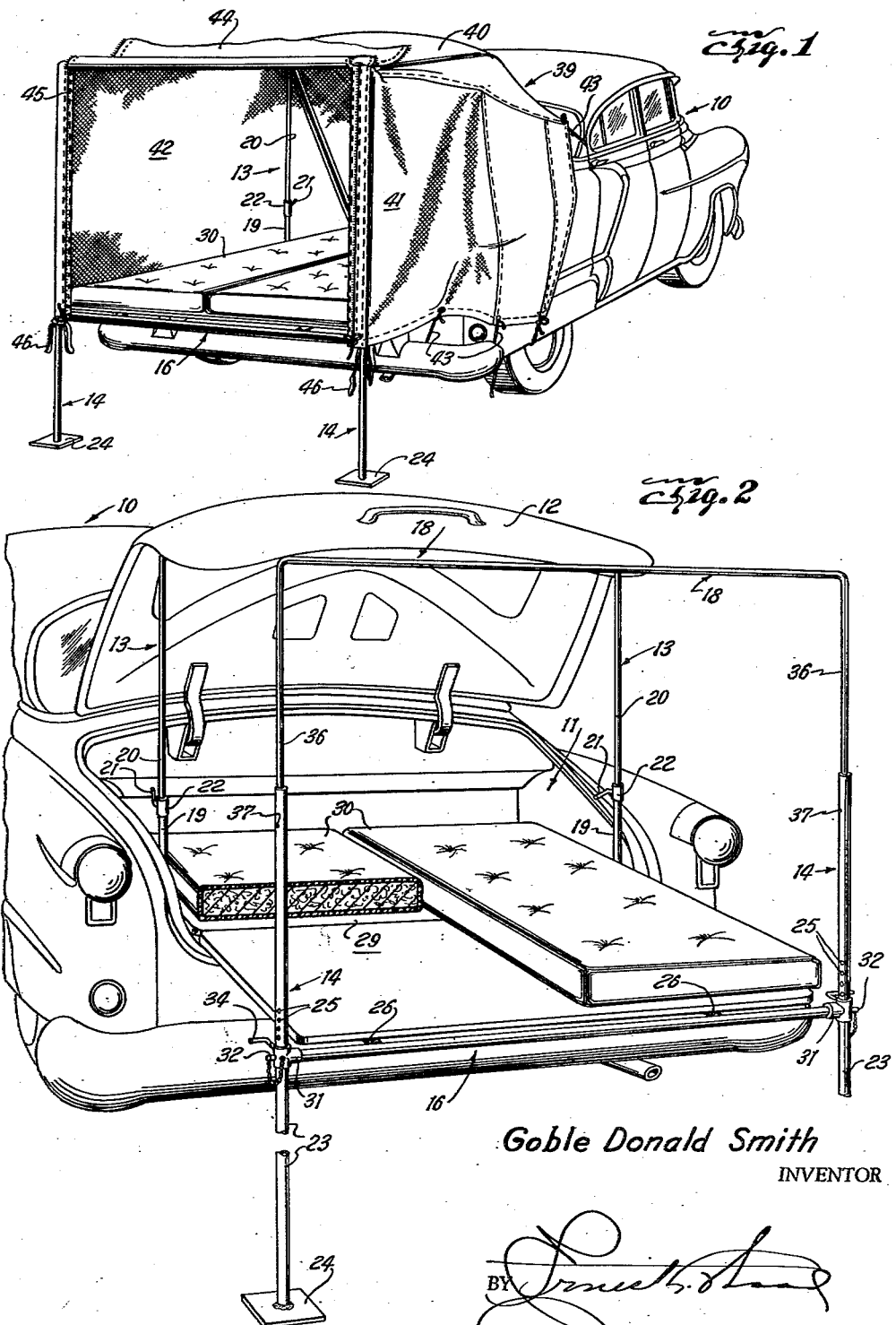

2,815,762

COLLAPSIBLE CANOPY FRAME ATTACHMENT FOR VEHICLE TRUNKS

Goble Donald Smith, Dallas, Tex.

Application December 13, 1954, Serial No. 474,900

2 Claims. (Cl. 135—5)

This invention relates to collapsible canopy frames and more particularly to such frames adapted to be carried in and supported from an automobile trunk as temporary sleeping quarters.

The principal object of the invention is to provide a canopy frame in which all of the parts thereof are separable one from the other for convenient and compact storage in the trunk of an automobile and when assembled, the parts form a sturdy canopy frame having its front support in the said automobile trunk and its rear support adjustably resting on the ground.

Another object of the invention is to provide a canopy frame whose novel design enables it to be erected and disassembled in a matter of minutes by virtue of the fact that its parts are held in assembled relationship without the aid of nuts and bolts or other such securing means requiring time to manipulate.

Still another object of the invention is to provide a canopy frame as set forth which, in assembled position, provides a support for a deck or platform in two sections for compactness and on which is placed sleeping pads.

Yet another object of the invention is to provide extensible supports for the lid of the vehicle trunk to stabilize the same when the frame is assembled for sleeping quarters, the said lid providing a measure of protection for the bed occupants and serves also as a part of the support for a canopy, the frame providing further support for the canopy at the rear thereof where the canopy has an entrance opening closed by a flap provided with slide fasteners.

Other objects will appear as the description proceeds when considered with the annexed drawing, wherein:

Figure 1 is a rear perspective view of an automobile showing the invention installed in its trunk.

Figure 2 is a fragmentary rear perspective view of the automobile on a larger scale with parts of the assembly broken away and in section and from which the canopy has been deleted.

Figure 3 is a rear perspective view similar to but opposite that shown in Figure 2, to show the forward support for the frame in the vehicle trunk, and Figure 4 is a perspective view of the collective parts of the canopy frame generally disposed in the order of their assembly.

Continuing with a more detailed description of the drawing, reference numeral 10 denotes generally a vehicle having a trunk 11 and a hinged lid or cover 12.

The invention is composed broadly of a pair of trunk lid supports 13, a pair of rear supports or legs 14, a pair of horizontal side, longitudinal rails 15, a rear transverse rail 16, a forward support 17 and an inverted substantially U-shaped canopy supporting frame 18.

More specifically described, the lid supporting members 13 constitute the members first installed in setting up the canopy frame. These members each consists of a tube 19 into which is telescoped a smaller tube or rod 20. The lower end of the tube 19 is set down on the floor of the trunk 11 and the member 20 is placed against the undersurface of the trunk lid 12 after the latter has been urged to the limit of its upward travel. A lever set screw 21 is threaded through a collar 22 on the tube 19 and bears against the smaller tube 20 to hold the same in longitudinally adjusted positions, thus to secure the lid 12 against movement.

The rear end supports or legs 14 are each composed of an elongate tube 23, on one end of which is welded or otherwise affixed a ground engaging shoe or plate 24. Intermediate the ends of each leg 14 there is provided a plurality of longitudinally spaced diametrical apertures 25 to which further reference will be made presently.

The two horizontal rails 15 are also of tubular stock and are composed of two separable sections 26 and 27, section 26 constituting the outer section while section 27 is the inner section, that is, it extends into the trunk 12 in the manner shown in Figures 2 and 3. The sections 26 and 27 are joined in end to end relationship by means of a rod 28 (Figure 4) which is secured in one end of each section 26 and is of smaller diameter than the companion section 27 into which it extends, thus making the assembled sections 26 and 27 rigid so as to provide a support for the platforms 29 (Figure 2) of plywood or other suitable material and which, in turn, support the sleeping pads 30 of which there are preferably two for convenience in storing. The mattresses are arranged lengthwise of the frame in relative parallelism while the supports 29 of which there are also two for like reasons, are disposed transversely of the frame.

The outer ends of the rails 15 are supported by the transverse rail 16, which is also tubular, by means of lateral pins 16a affixed to the transverse rail at points spaced from its ends and which are received in the ends of the rear sections 26 of the horizontal rails 15. The rail 16 has a T fitting 31 threaded or otherwise secured to each end. These T's 31 slidably receive the leg members 14 and are held in vertically adjusted position therein by pins 32 attached to short lengths of chains 33 to prevent misplacement or loss and which are inserted through a selected aperture of the group of apertures 25 below the T 31. The chains, in turn, are secured to the T's 31 in the manner shown. In order to temporarily hold the T's 31 in position while adjusting the frame during erection, a lever bolt 34 is threaded through the vertical portion of the T to engage the leg 23.

As a supporting means for the forward end of the frame, the elongate U-shaped member 17 is provided which has affixed or formed on each end a lateral extension 35 (Figure 4). These extensions are adapted to enter into the forward ends of the forward sections 27 of the horizontal side rails 15 in the manner shown in Figure 3. The U-shaped support 17 rests on the floor of the trunk 12 and the T's 31 are adjusted vertically on the legs 23 to cause the outer ends of the rails 15 to be adjusted to the same height as their forward ends and to accommodate the frame to any ground level irregularities. The shoes 24 on the legs 23 will prevent the ends of the legs from penetrating the ground.

The rear canopy support 18 consists simply of a rod bent into U-shape and is inverted in the erection of the frame to insert the legs 36 of the support 18 into the tops of the supporting legs 23 in the manner shown in Figure 3. A transverse pin 37 in the legs 23, spaced downwardly from the tops thereof, serves as a stop for the ends of the legs 36 of the canopy supporting frame 18 to sustain the latter in proper position in relation to the raised trunk lid 12 which, as pointed out earlier, serves as the front support for the canopy which is generally indicated in Figure 1 by reference numeral 39.

When the frame is erected in the manner shown, the two plywood boards 29 are placed across from one to the other of the side rails 15 in a transverse manner and upon the deck or platform formed by these boards is placed the two sleeping pads 30 in a longitudinal position in parallel relationship. Of course, a single mattress may be used but two pads are shown as being more convenient to store in the trunk when the frame is dismantled. Usually, the mattresses or pads 30 are rolled in the canopy 39 for storage.

To erect the frame, all of the parts thereof are removed from the trunk in which they are stored in parallel relationship and for expediency are placed in the manner shown in Figure 4, that is, in their order of assembly. First, the lid supports 13 are set in the position shown to hold the lid in secure position. The transverse rail 16 is manipulated on the ground so that the pins 16a thereon will stand upright. The outer sections 26 of the horizontal rails 15 are then set down on the pins 16a and the inner sections 27 of these rails are then telescoped onto the longitudinal extensions 28 of the sections 26. The U-shaped inner supporting member 17 is positioned so that its lateral extensions 35 will enter the tops of the now assembled and upright rails 15. The leg members 23 are slid through the T's 31 at the ends of the transverse rail 16 and are temporarily secured by the leverbolts 34. The frame is now in condition where the rails 15 may be lowered from upright to horizontal position and moved so that the U-shaped support 17 will bear against the front wall of the trunk and rest upon the floor thereof. When this is accomplished, the U-shaped canopy supporting frame 18 is disposed so that its legs 36 will telescope into the tops of the frame supporting legs 14. The frame is now in condition to receive the canopy 39.

Before arranging the canopy on the frame, the boards 29 and sleeping pads 30 are arranged on the rails 15 in the manner shown.

The canopy 39 is constructed of waterproof fabric and is especially designed with top 40 (Figure 1) sides 41 which latter are composed of both heavy fabric on the outside and mosquito netting 42 on the inside. A series of cords 43 are attached at various points along the edges of the canopy on one side and are drawn under the vehicle at certain points and secured in eyelets provided on the opposite side of the canopy. Another cord is passed through the vehicle from door to door and is secured at its ends to the canopy adjacent the rear window of the vehicle in the manner shown in Figure 1. The rear of the canopy is closed by a flap 44 which is shown in Figure 1 is being thrown back onto the top of the canopy. Suitable slide fasteners 45 secure the edges of the flap 44 in closed position thereof. The lower rear edges of the sides 41 are secured by webbing 46.

In warm weather and in localities where there are insects, the heavy fabric sides 41 may be thrown onto the top of the canopy while the netting 42 may be secured in place of the fabric sides 41, thus to provide more comfortable sleeping in the bunk provided by the described arrangement.

Manifestly, the construction as shown and described is capable of some modification and such modification as may be construed to fall within the scope and meaning of the appended claims is also considered to be within the spirit and intent of the invention.

What is claimed is:

1. In combination with the trunk compartment of a vehicle, a collapsible canopy frame comprising a pair of spaced apart, tubular leg members, each having a ground engaging shoe on one end and a plurality of longitudinally spaced, diametrical apertures intermediate its ends, a rear transverse rail between said leg members having means on its ends slidably embracing said leg members, means engageable selectively in said apertures for supporting the ends of said rear transverse rail in vertically adjusted positions on said leg members, a pair of horizontal tubular side rails in axially aligned and separable sections, one end each of said horizontal side rails being connected to said rear transverse rail adjacent an end thereof, a U-shaped forward support for said frame opposite said legs adapted to rest on the floor of said trunk compartment, said forward support having an extension on each end engaging the opposite end of each of said horizontal side rails, an inverted U-shape canopy supporting frame having its legs engaging the upper ends of said leg members, a removable sectional platform supported on said horizontal side rails, sleeping pads on said platform, a canopy embracing said frame and means for securing said canopy onto said frame.

2. In combination with a vehicle having a trunk compartment provided with a lid, a collapsible canopy frame adapted to be supported at its forward end in said trunk comprising a pair of leg members for supporting the rear end of said frame, a rear transverse tubular rail having its ends adjustable vertically on said leg members, a pair of tubular side rails, each having its rear end attached to said rear transverse rail adjacent an end thereof, a substantially U-shaped forward support detachably connected at its ends to the forward ends of said side rails and adapted to rest on the floor of said trunk compartment, an inverted U-shaped canopy supporting frame connected to the upper ends of said leg members and extending upwardly therefrom, a canopy overlying said U-shaped canopy supporting frame and said trunk compartment lid having sides and a rear entrance flap and means for securing said canopy on said frame.

References Cited in the file of this patent

UNITED STATES PATENTS

| | | |
|---|---|---|
| 1,427,749 | Leech | Aug. 29, 1922 |
| 1,471,279 | Raggis | Oct. 16, 1923 |
| 1,696,286 | Smith | Dec. 25, 1928 |
| 2,210,540 | Nielson | Aug. 6, 1940 |
| 2,483,478 | Smelker | Oct. 4, 1949 |
| 2,643,395 | Stassinos | June 30, 1953 |